(12) United States Patent
Zimmern et al.

(10) Patent No.: US 6,767,524 B2
(45) Date of Patent: Jul. 27, 2004

(54) PROCESS TO PRODUCE NEARLY OIL FREE COMPRESSED AMMONIA AND SYSTEM TO IMPLEMENT IT

(76) Inventors: Bernard Zimmern, 6, New St. East, East Norwalk, CT (US) 06855; Jean-Louis Picouet, 1613, Legend Hill La., Waukesha, WI (US) 53189

( * ) Notice: Subject to any disclaimer, the term of this patent is extended or adjusted under 35 U.S.C. 154(b) by 168 days.

(21) Appl. No.: 10/119,021

(22) Filed: Apr. 10, 2002

(65) Prior Publication Data

US 2003/0091494 A1 May 15, 2003

Related U.S. Application Data

(60) Provisional application No. 60/335,366, filed on Nov. 15, 2001.

(51) Int. Cl.[7] .............................. C01C 1/12; F25B 1/04; F25B 43/02
(52) U.S. Cl. ............................. 423/352; 62/191; 62/470
(58) Field of Search .................... 423/352; 62/191–194, 62/468–473

(56) References Cited

U.S. PATENT DOCUMENTS

| | | | |
|---|---|---|---|
| 4,275,570 A | 6/1981 | Szymaszek et al. | 62/468 |
| 4,280,337 A | 7/1981 | Kemp | 62/476 |
| 4,312,187 A | 1/1982 | Myers | 62/84 |
| 4,419,865 A | 12/1983 | Szymaszek | 62/193 |
| 4,497,185 A | 2/1985 | Shaw | 62/468 |
| 5,042,271 A | 8/1991 | Manz | 62/473 |
| 5,086,621 A | 2/1992 | Starner et al. | 62/84 |
| 5,086,630 A | 2/1992 | Van Steenburgh, Jr. | 62/475 |
| 5,195,331 A | 3/1993 | Zimmern et al. | 62/202 |
| 5,431,025 A * | 7/1995 | Oltman et al. | 62/84 |
| 6,174,140 B1 | 1/2001 | Ota et al. | 417/222.2 |
| 6,233,967 B1 | 5/2001 | Seewald et al. | 62/470 |

* cited by examiner

Primary Examiner—Stanley S. Silverman
Assistant Examiner—Maribel Medina
(74) Attorney, Agent, or Firm—Young & Thompson

(57) ABSTRACT

Process and system to produce nearly oil free ammonia using a rotary compressor with liquid injection from a separator tank where the liquid in the tank includes oil and liquid ammonia. The level of oil in the compressed ammonia leaving the separator is much lower than in conventional separators with coalescing elements, because the temperature is lower and there is less oil departure in oil vapor form.

13 Claims, 2 Drawing Sheets

PROCESS TO PRODUCE NEARLY OIL FREE COMPRESSED AMMONIA AND SYSTEM TO IMPLEMENT IT

CROSS REFERENCE TO RELATED APPLICATION

This application claims the 35 USC §119(e) benefit of U.S. Provisional application No. 60/335,366, filed on Nov. 15, 2001.

BACKGROUND OF THE INVENTION

It is well known how to compress ammonia gas by using a rotary compressor that is cooled and sealed by oil injection, and to separate the oil from the discharge gas in a tank from which the compressed gas is sent to its final destination whereas the oil, separated from the gas, is reinjected into the compressor for further sealing and cooling.

Hereafter, ammonia gas will be designated by "ammonia" whereas the condensed gas will be designated as "liquid ammonia"

This oil, that catches most of the heat of compression, is often cooled by an injection of liquid ammonia into the compressor.

The amount of liquid injection is usually controlled by the discharge temperature of the gas to insure that the gas remains superheated and that no liquid ammonia reaches the oil tank.

Indeed, inside the oil tank, there are generally coalescing elements, made of fine plastic fibers of which the role is to capture the maximum amount of oil droplets in the discharge gas; and those fibers do not like to get in contact with liquid ammonia that would easily attack and destroy them. Coalescing elements, made of metal fibers or metal strips, are too coarse and do not offer enough contact surface to properly catch the oil droplets.

One important downside of that process and corresponding systems is that the compressed ammonia contains a sizable amount of oil in vapor form.

Indeed, to keep the gas superheated means that the oil has to be at a temperature above the ammonia condensing temperature by generally as much as 10 to 20° C. and this leads to a substantial increase in the oil vapor pressure that can mean a few parts per million of weight of oil vapor in the gas, comparable to the weight of oil entrained as droplets.

For large coalescing elements, it is common to achieve an oil content in the 5 to 10 ppm (parts per million in weight of oil compared to the weight of compressed ammonia) range, and going below 2 to 5 ppm becomes nearly impossible with even very large coalescing fibers because of the oil temperature and the corresponding departure of oil in vapor form.

SUMMARY OF THE INVENTION

This invention relates to a process to produce nearly oil free compressed ammonia, including using a rotary compressor to compress ammonia, injecting a liquid into the compressor, discharging the compressed ammonia mixed with said liquid into a separator tank, separating said compressed ammonia from the liquid and reinjecting said liquid into the compressor, cooling the compressed ammonia to absorb at least partly the heat of compression and characterized by maintaining liquid ammonia, at least in droplets form, in at least part of the separator tank, through the amount of cooling.

This invention relates also to a system allowing to implement substantially the process described above, i.e. a system to produce nearly oil free compressed ammonia, comprising a rotary compressor, having at least one discharge pipe connected to a separator tank, at least one pipe connecting such separator tank to at least one injection port in said compressor, means to cool the compressed ammonia discharging from the compressor and characterized in that there are means to create droplets of liquid ammonia in the compressed ammonia stream, means to collect at least part of them and to return them to the compressor.

In a particular embodiment, this invention relates to a system to produce nearly oil free compressed ammonia, comprising a rotary compressor, having at least one discharge pipe connected to a separator tank, at least one pipe connecting such separator tank to at least one injection port in said compressor, means to cool the compressed ammonia discharging from the compressor, means to control the amount of such cooling, means to measure the liquid level in said separator and characterized in that the means to control the amount of cooling are actuated by the means to measure said liquid level.

The advantages of the process and its corresponding system is that, as there is liquid ammonia in at least part of the separator tank, the compressed ammonia is at ammonia condensing temperature, i.e. 10 to 20° C. cooler than in conventional systems; and this creates a substantial decrease in the amount of oil entrained as vapor.

But unexpectedly, the total elimination of the coalescing element or their replacement by coarse elements in metal does not induce a higher carry-over of oil in droplet form.

On the contrary, injecting liquid ammonia and oil in approximately equal proportions and compressing ammonia at pressures corresponding to a condensing temperature of 45° C., it has been found that the amount of oil departing with the compressed gas was below half of a ppm and could be nearly qualified as oil free compressed ammonia.

Without this being proven and just as a means of providing a possible explanation for this remarkable result, it is possible that the droplets of liquid ammonia, flying with the discharge gas or created in the separator tank, offer a huge surface of contact, equivalent to the surface of the fibers in a coalescing element, that can easily capture the flying droplets of oil and that the size of the ammonia droplets being larger than the droplets of oil because of the lower surface tension of the oil, they fall faster, hence more of the oil droplets can be collected before they leave the separator tank than if the oil droplets were left alone.

In the above invention, the rotary compressor can be any rotary compressor such as rotary vanes, rotary pistons, scrolls or screws.

The tank can be of any convenient shape such as vertical or horizontal, even though a horizontal shape is more appropriate as it gives more time for the droplets to be collected.

The oil can be any mineral oil or chemical compound having lubricating properties and not miscible with ammonia.

The liquid injected from the tank into the compressor can mean oil or a mixture of oil and liquid ammonia.

In a first embodiment of the invention, the cooling of the compressed ammonia coming out of the compressor is achieved by sending the mixture of gas and liquid through a heat exchanger, for instance a heat exchanger cooled by water. Some of the heat of compression remains in the compressed gas since its pressure and condensing temperature increased but the rest is removed by the water.

In a second embodiment of the process and system, the cooling of the compressed ammonia discharging from the compressor is done by an injection, into the compressor, of liquid ammonia coming from an auxiliary source such as a condenser where, in refrigeration systems, the compressed ammonia is condensed.

This liquid is compressed with the ammonia gas and flashes in the discharge pipe, absorbing at least part of the heat of compression.

But this invention would not be modified by combining the first and second embodiments and cooling through a combination of auxiliary liquid ammonia injection and of a heat exchanger.

In a third embodiment, the oil and liquid ammonia falling into the separator tank, are extracted separately from this tank and mixed in a substantially controlled percentage before being reinjected into the compressor.

As oil is a much better sealant than liquid ammonia but creates a much higher viscous drag, this allows to change the concentration of oil as a function of the speed of the compressor and to select the percentage that gives the best efficiency i.e. the best compromise between increasing volumetric efficiency by increasing the percentage of oil and reducing the friction power loss by increasing the percentage of liquid.

BRIEF DESCRIPTION OF THE DRAWINGS

This invention will be better understood by looking at the drawing given as non limiting example and where.

DETAILED DESCRIPTION OF THE INVENTION

Figure 1:
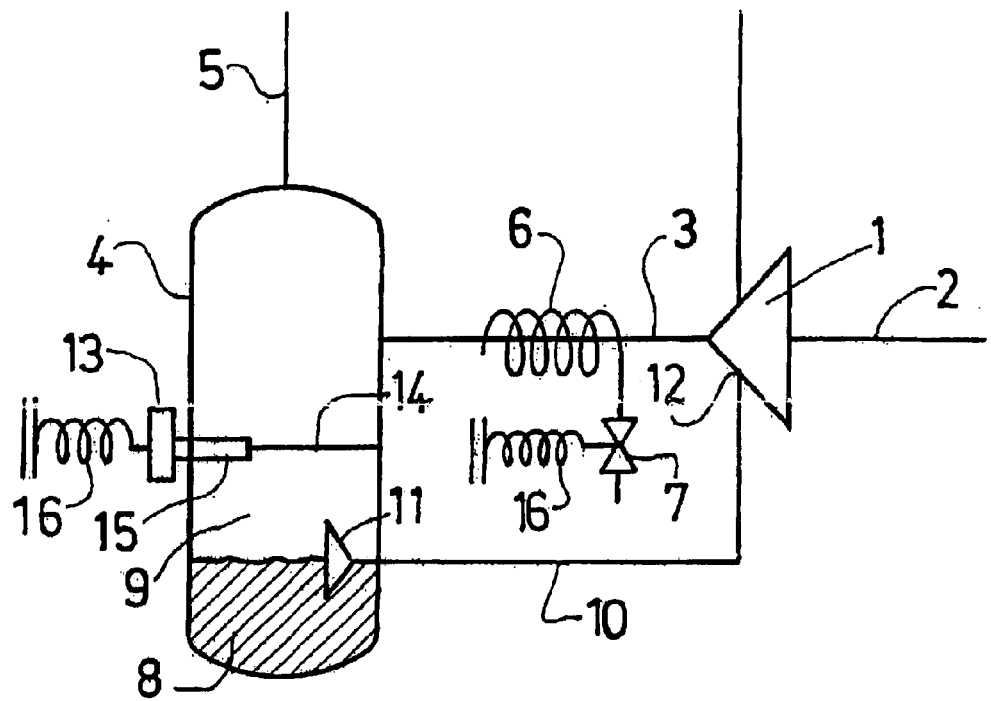
FIGS. 1 and 2 show two possible schematics of the system and FIGS. 3 and 4 are cross sections of separator tanks, different from those shown in FIGS. 1 and 2 but still in accordance with the invention.

On FIG. 1, a rotary compressor 1, driven by a power source not shown, is sucking ammonia by a suction duct 2.

Compressed ammonia is discharged through pipe 3 into a separator tank 4 where the compressed ammonia is leaving by pipe 5 toward its final use.

On the discharge pipe 3, there is a heat exchanger 6 to cool at least partially what is discharged from the compressor. The cooling is provided by any appropriate cooling medium such as water. The amount of cooling medium, sent into the heat exchanger 6, is controlled by any appropriate means such as the valve 7.

Inside the separator tank 4, when the system is in operation, there is a certain amount of oil 8, and above, an amount of liquid ammonia 9. A pipe 10 is attached to the separator approximately at the level between liquid ammonia and oil and carries a funnel 11. This pipe 10 is connected to an injection port 12 in the compressor. When the compressor is running, the pressure created in the tank 4 pushes the liquid 9 and the oil 8 to the funnel 11 and they are injected together in the compressor by the pipe 10 and port 12.

The ammonia gas sucked by pipe 2 is rejected into the pipe 3 together with oil and liquid ammonia coming from pipe 10; arriving in tank 4, liquid and oil fall whereas the compressed ammonia leaves by pipe 5 for its destination such as a condenser if this ammonia is used in a refrigeration system.

As heat is produced during the compression, liquid ammonia is vaporized when compressed ammonia, oil and liquid ammonia discharge from the compressor and the level of liquid ammonia would fall in tank 4 but for the heat exchanger 6 that cools the mixture, allowing some of the compressed ammonia gas to condense.

But to prevent an excess of condensation of liquid ammonia, a level sensor 13 is installed in the tank 4 of which the signal is used to control the flow of cooling medium delivered by the valve 7.

The sensor 13 may be made, for instance, of a bulb 15 protruding into the tank, partially filled with liquid ammonia in which dips an electrical heater not shown. When the level of the liquid falls below the bulb 15, the bulb is no longer cooled externally by the liquid of the tank and the electrical heater raises the pressure inside the bulb that, through the capillary 16, opens the valve 7, increasing the cooling that in turn leads to more ammonia condensing until the level 14 reaches the bulb, starts to cool it, which drops the pressure inside the bulb and starts to close the valve 7.

It should be noted that, when the mixture of compressed ammonia, liquid ammonia and oil discharge into the separator tank from the pipe 3, oil and liquid fall whereas the compressed ammonia gas leaves by the pipe 5 for its further use such as providing liquid ammonia for refrigeration, after passing through a condenser.

Liquid ammonia and oil fall in the bottom of the tank where the oil separates quickly from the liquid due to their great difference in density since oil has generally a density around 0.9 whereas liquid ammonia density is around 0.6. But it should be noted that it is possible without changing the invention not to let the oil and liquid ammonia separate completely and reinject them as a mixture by reinjecting it sufficiently fast and maintaining some turbulence in the tank.

When letting oil and liquid ammonia to separate, particularly in horizontal separator tanks, it is worth to maintain a minimum-thickness of the liquid ammonia film over the oil. Indeed, when there is a drop in condensing pressure, the oil that has accumulated in the separator tank prior to the drop is hotter than the condensing temperature after the drop, and this oil tends to flash whatever amount of liquid is still mixed with the oil. The corresponding flash gas creates bubbles that start to ascend in the oil. When they reach the liquid film, they continue to ascend through the liquid; if the film of liquid is thin, they can reach the surface of the liquid ammonia and make an oil foam, floating over the liquid, that can be easily carried away by the stream of ammonia gas, inducing an unexpected loss of oil. It has been found that a thickness of over 4 centimeters of the liquid ammonia film is enough to practically eliminate such foaming. When the bubbles enter the ammonia film, because this film is at the condensation temperature, these bubbles start to condense and do not reach the surface if the thickness of the film is sufficient.

Also, when compressed ammonia, liquid ammonia and oil are discharged together, liquid ammonia forms a cloud of droplets and those droplets catch the droplets of oil and make them fall into the bottom of the tank.

Figure 2:
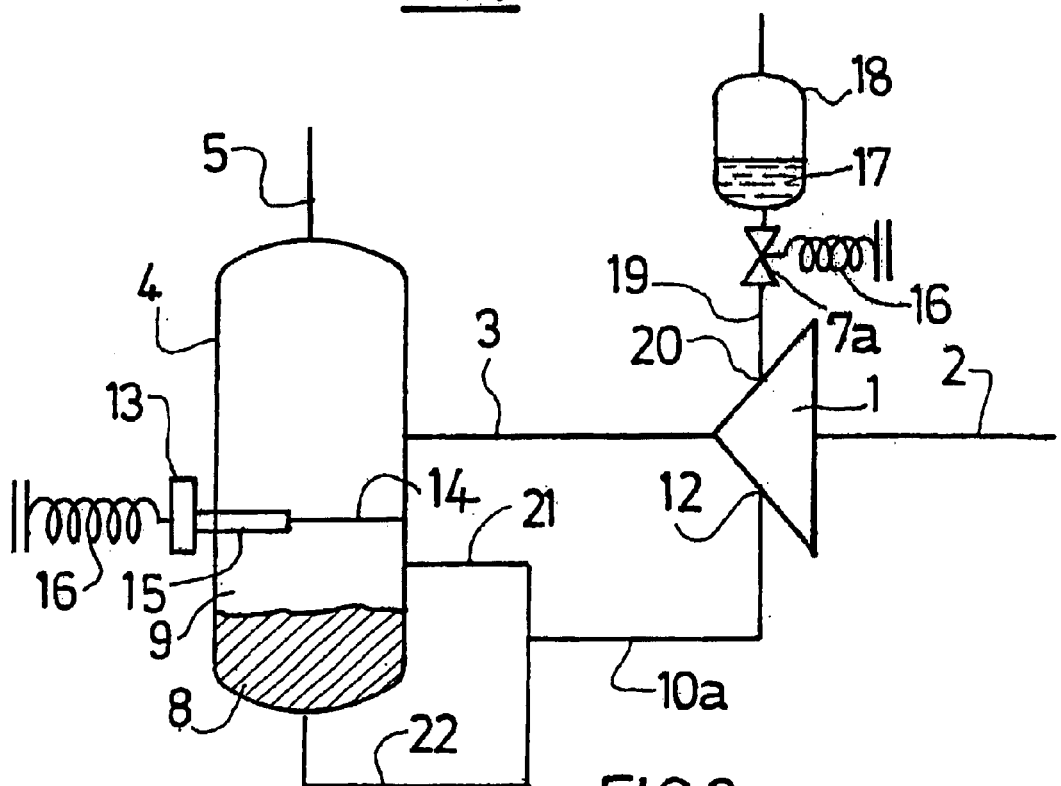

Another embodiment of the invention is shown in FIG. 2.

There is still a rotary compressor 1 with suction 2, discharge 3, separator tank 4, discharge pipe 5, oil 8, liquid ammonia 9, and sensor 13 with bulb 15 and capillary 16.

But the heat exchanger 6 is replaced by a source of liquid ammonia 17 in a tank 18 that is connected by a pipe 19, through a valve 7a, to a second injection port 20 into the compressor.

Also, as a separate modification, independent from the replacement of the heat exchanger by a source of liquid ammonia, the funnel 11 has been eliminated and replaced by two pipes 21 and 22 connected to the separator tank and joining into a pipe 10a that goes into the injection port 12.

Pipe 21 is located in the tank above the oil level whereas pipe 22 leaves from the bottom.

Nevertheless the invention would not be changed if pipes 19 and 10a would merge before entering the compressor so as to use only one injection port or if, on the opposite, the injections were done through many ports.

In this embodiment, cooling of the discharged compressed ammonia is achieved by some extra liquid ammonia coming from tank 18 that, itself could come from any available source, for instance liquid ammonia condensed from the gas leaving by the pipe 5.

This liquid ammonia helps cool the mixture leaving from the compressor and maintains the level of liquid ammonia 14. Its flow is controlled by the valve 7a activated by the capillary 16 from the sensor 13 as in FIG. 1.

The replacement of the funnel 11 by two separate pipes 21 and 22 allows to better control the respective proportion of oil and liquid ammonia reinjected into the compressor.

This percentage can be set by any acceptable means such as valves or nozzles (not shown) on pipes 21 and 22.

It is therefore possible to change that proportion at will and select the percentage that provides the compressor with the best efficiency.

Indeed depending upon the speed of rotation of the compressor, it could be best to run with a high or low percentage of oil.

An increase in oil percentage improves indeed the volumetric efficiency as oil is a better sealant than liquid ammonia; but oil creates a much higher viscous drag than liquid ammonia and that increases the power absorbed; there is generally a percentage for which the balance is optimum.

At certain conditions, such as low speed, it may even be preferable not to inject any liquid by the pipe 21 and to send only oil by pipe 22, and, if this speed is permanent, to eliminate the pipe 21 provided the cooling means insure that there remains liquid ammonia in the separator tank.

Figure 3:
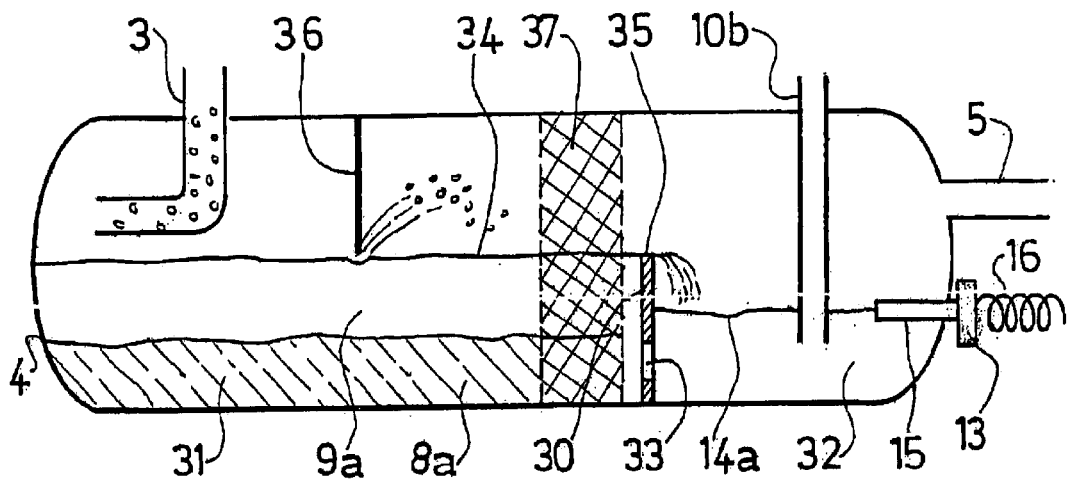

FIG. 3 shows a cross section of a tank 4 according to another embodiment of this invention.

In this embodiment, the tank is substantially horizontal.

It is separated by a wall 30 raising approximately to the center of the tank and dividing the tank in two compartments 31 and 32.

The discharge pipe 3 enters into the compartment 31.

The discharge pipe 5, the pipe 10b by which the mixture of oil and liquid ammonia leave for injection into the compressor, and the level sensor 13 with bulb 15 are located on the compartment 32.

An orifice 33 is made in the wall 30 in its lower part.

When oil and liquid ammonia arrive through pipe 3, they fall in the compartment 30 and quickly separate into oil shown in 8a and liquid ammonia shown in 9a.

Oil passes through orifice 33 into compartment 32. The size of the orifice is defined so that, if it arrives only oil from the compartment 31 in to the compartment 32, the level in that compartment 32 falls below the level of the bulb 15. As this one is not cooled, it increases the cooling that sends liquid ammonia into the tank until liquid ammonia overflows from compartment 31 above the edge 35 of the wall 30, into the compartment 32 and maintains a level 14a that insures the cooling of the bulb.

It should be noted that the flow of oil through the hole 33 depends upon the difference between the level 14a and the level 34 defined by the edge 35: the lower this level 14a, the more oil is flowing, due to an increase in the differential height and hence the hydraulic pressure on oil at the orifice 33.

Therefore the height of the sensor 13 as well as the size of the hole 33 define the percentage of oil.

By varying one of those parameters, it is possible to change that percentage.

This can be done for instance in placing the bulb not horizontally as shown but vertically so that the amount of liquid encircling the bulb and therefore the cooling depends upon the level 14a.

By changing the amount of electrical heat supplied to the bulb, it is therefore possible to change that level and, hence, the percentage of oil.

When using a rotary compressor driven by an electric motor, itself driven by an inverter, it is possible to set the amount of heat sent to the bulb as a function of the frequency of the inverter so as to increase that heat when the speed increases; that, in turn, reduces the amount of oil and therefore adjusts the content of oil to the best value for efficiency.

A further improvement is to provide for another wall 36 hanging from the top of the separator and coming close to the surface 34 of the liquid so as to provide a limited space between that wall and the surface 34, forcing the gas to entrain some liquid and increasing the contact between whatever oil droplets are still in the compressed ammonia and liquid droplets.

An element 37 made for instance of coarse steel wire or steel chips helps capture the liquid droplets in its upper part and acts as a coarse filter for oil on its lower part.

Using a rotary compressor of around 200 cfm capacity, and compressing ammonia from a pressure corresponding to around minus 10° C. to a pressure corresponding to a condensing temperature around 30° C., with a separator tank as just described with diameter 30 centimeters and length 180 centimeters, horizontal, with compartment 31 having a length of 120 centimeters, with around 3 gpm (gallon per minute) of oil injected from the separator with a concentration in oil around 50% and around 1,5 gpm of liquid ammonia coming from a condenser injected, the content of oil in the compressed ammonia measured by extracting the oil from the condenser, has been measured to stand around 0,3 ppm.

Figure 4:
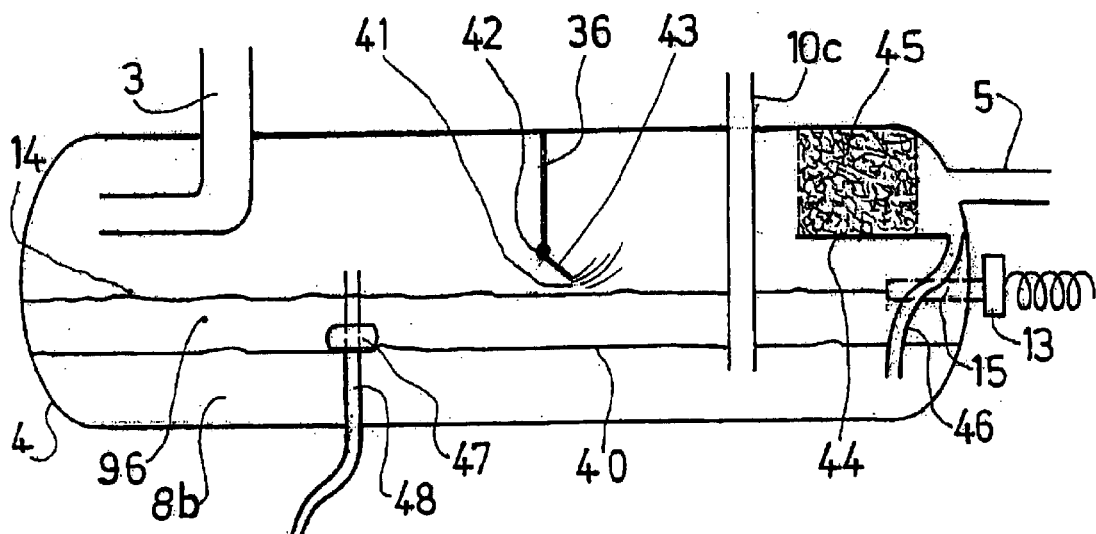

Similar remarkable low oil departure results have been obtained even with a concentration of oil leaving the separator close to 100%, by using a separator tank in accordance with FIG. 4.

When the compressor is running at low speed, it is indeed best, for efficiency, to inject only oil.

One can see on FIG. 4 the compressor discharge pipe 3 entering in the separator tank 4 with the liquid injection line 10c returning to the compressor, a level sensor 13 with a bulb 15 (shown in dotted lines), the oil volume 8b with its upper level 40, the liquid ammonia volume with its upper surface 14, a wall 36 hanging to define, with the surface of the liquid a narrow passage 41 in order to blow the surface 14 into droplets of liquid ammonia. As an improvement on the wall 36 shown on FIG. 3, now, on FIG. 4, the wall 36 carries a hinge 42 holding a flap 43, that can lift more or less depending upon the gas flow coming out of the compressor, can therefore increase or decrease the passage 41 and therefore can maintain a gas velocity approximately constant through the passage 41 so as to insure a spray of liquid ammonia whatever the compressor changes of discharge flow. In order to prevent this flap to oscillate, one side of the flap carries an extension (not shown) that dips into the liquid, like a paddle, and dampens those oscillations.

Also, the discharge end of the tank carries a partition 44, slightly inclined, a mesh element 45 made for instance of coarse steel wire, a tube linking the end of the partition 44 to just a little below the level 40 of the oil.

There is also a float 47 that slides along a tube 48, inside which there are sensors to catch the level of the float 47. The density of the float is approximately 0,75, i.e. half way between the density of oil and of liquid ammonia, so as to stay on top of the oil. For instance, there is an upper sensor that, when activated by the level of the float, opens an oil valve not shown and oil is drained out of the tank for a short period of time to lower the oil level. Also, there could be a lower sensor that could trigger an alarm in case of an unexpected loss of oil.

It is therefore possible to control the level of oil within tight limits and, in combination with the level sensor 13, insure that the thickness of liquid ammonia 9b is maintained over 4 centimeters.

In this embodiment, it should be noted that, theoretically, only oil is leaving from the tank by the pipe 10c. In fact, it has been found that some liquid ammonia is also leaving with the oil representing a few percents of the oil volume. This liquid is probably trapped in the oil and did not had sufficient time to segregate. Since in normal operation, the level 14 is steady, this mean that the same amount of liquid has to return with the gas from the compressor by the pipe 3.

It has been found that those few percents catch most of the oil droplets coming from the compressor; but, as a safety, particularly during transient conditions, it is preferable to add liquid ammonia droplets in the compressed ammonia stream, using the wall 36 as shown in FIG. 3 or the wall 36 with the flap 43 as shown in FIG. 4.

These droplets are caught by the element 45, drain onto the partition 44 and are collected by the tube 46. This tube 46 should enter into the oil volume but not go down to the bottom, because otherwise, as the liquid is lighter than oil, for the liquid to drain, the liquid would need a substantial height over the level 14 to be able to push the oil, i.e. liquid could accumulate over the partition 44 and be taken away through the discharge pipe 5 with whatever oil droplets this liquid may have trapped.

Rather than to rely on the liquid trapped in the oil to insure the renewal of the liquid ammonia in the separator tank, as an alternate solution, it is also possible to remove some of the liquid sitting in volume 9b by sending it for instance to an evaporator; this would insure that, even oil containing no liquid is taken from the separator tank to be injected into the compressor, replacement liquid ammonia has to be provided by the pipe 3, through cooling of the compressed ammonia, to maintain the liquid ammonia level; and this generates enough liquid droplets to catch the oil droplets.

As an alternative, In the absence of any liquid ammonia leaving the separator, the capture of the oil droplets can nevertheless be achieved by forcing the compressed ammonia stream to mix, as already shown, with the film 9b of liquid ammonia. But this result can only be achieved if there is liquid ammonia with the oil in the separator tank.

But this invention would not be modified if the compressed ammonia was cooled by passing through a heat exchanger located after the separator, or if the heat exchanger was in the separator, provided that, in all cases, the liquid ammonia, condensed from the compressed ammonia, returns into the compressor, directly or through the separator. For instance, the separator tank could be divided in two (or more) parts, the first one where the oil would separate from the compressed ammonia and stay superheated to be reinjected into the compressor, the compressed ammonia passing through a cooler generating droplets of liquid ammonia in the gas stream before entering a second part of the separator where these droplets of liquid ammonia would trap the oil droplets, be collected for at least most of them by appropriate means, such as coarse steel mesh as already described, and sent back to the compressor directly or with the oil. Liquid ammonia would therefore be present not in the first part but in the second part of the tank and the compressed ammonia would leave the separator at condensing temperature without superheat.

The control of the amount of cooling, before the first part of the separator, could easily be done by measuring the temperature of the oil and maintaining a certain level of surperheat. The amount of cooling before the second part of the separator, to insure a certain density of ammonia liquid droplets, could be controlled by the amount of negative superheat as shown in U.S. Pat. No. 5,195,331. A bulb in the gas stream activates a thermal expansion valve that controls the amount of cooling; it is internally heated by an electrical resistance and, the more heat is generated by the resistance, the higher the density of the liquid droplets condensed from the gas hitting the bulb before the bulb reaches equilibrium.

As a simpler alternative, by minimizing the superheat of the oil in the first part of the separator, the amount of cooling to create droplets in the second part is small and the cooling is designed to be always in excess in all operating conditions, without having to control it.

What is claimed is:

1. Process for producing nearly oil free compressed ammonia, which comprises:

using a rotary compressor to compress ammonia;

injecting a liquid into the compressor;

discharging compressed ammonia mixed with said liquid from said compressor into a separator tank;

separating said compressed ammonia from the liquid and reinjecting said liquid into the compressor;

cooling the compressed ammonia to absorb at least partly the heat of compression;

maintaining liquid ammonia, at least in droplets form, in at least part of the separator tank through the amount of cooling; and controlling the amount of cooling by a level of liquid in the separator tank.

2. The process according to claim 1, whereby cooling the compressed ammonia is achieved, at least partly, by injecting liquid ammonia into the compressor from an auxiliary source of liquid ammonia, and controlling the amount of such secondary injection by the level of liquid in the separator tank.

3. The process according to claim 1, further comprising separating, in the separator tank, at least partly liquid ammonia from the oil by using gravity and by disposing in the separator tank a volume of liquid ammonia above the volume of oil.

4. The process according to claim 3, further comprising forcing the compressed ammonia to mix with the surface of the liquid ammonia.

5. The process according to claim 3, further comprising using, for the liquid injected into the compressor from the tank, oil taken from the volume of oil.

6. The process according to claim 3, further comprising using, for the liquid injected into the compressor from the tank, oil taken from the volume of oil and liquid taken from the volume of liquid, mixing them and maintaining substantially constant the ratio of oil to liquid ammonia in the liquid reinjected.

7. The process according to claim 6, further comprising reducing the ratio of oil to liquid ammonia when the rotating speed of the compressor is increased.

8. The process according to claim 3, further comprising maintaining the thickness of the liquid ammonia over 4 centimeters.

9. System for producing nearly oil free compressed ammonia, comprising:
- a rotary compressor having at least one discharge pipe connected to a separator tank;
- at least one pipe connecting said separator tank to at least one injection port in said compressor;
- means for cooling compressed ammonia discharging from the compressor;
- means for controlling the amount of such cooling;
- means for measuring a liquid level in said separator;
- means for creating droplets of liquid ammonia in the separator tank;
- means for collecting at least part of said droplets of liquid ammonia; and
- means for returning collected droplets of liquid ammonia to the compressor;
- wherein the means for controlling the amount of cooling are actuated by the means for measuring said liquid level.

10. The system according to claim 9, wherein connected to a source containing liquid ammonia and to an injection port into the compressor; said pipe being equipped with a valve for controlling the flow of liquid ammonia.

11. The system according to claim 9, wherein, when in operation, the separator tank is substantially horizontal and has an inside wall transverse to its length; said wall having an upper part which is substantially horizontal and located substantially at the middle height of the tank; said wall having an orifice in its lower part; said wall dividing the separator tank in two compartments; the discharge pipe from the compressor being connected to one compartment whereas the other compartment is connected to a pipe connected to an injection port of the compressor, to an outlet pipe for the discharge of compressed ammonia, and carries the means for measuring the liquid level.

12. The system according to claim 9, wherein the separator tank is substantially horizontal and is equipped with means for forcing the compressed ammonia to mix with the surface of the liquid.

13. The system according to claim 12, wherein the separator tank carries a coarse mesh element, and a drain located close to the outlet pipe.

* * * * *